United States Patent [19]
Wilkins

[11] 4,016,075
[45] Apr. 5, 1977

[54] PROCESS FOR REMOVAL OF SILICA FROM GEOTHERMAL BRINE

[75] Inventor: Vernon H. Wilkins, Sacramento, Calif.

[73] Assignee: Southern Pacific Land Co., San Francisco, Calif.

[22] Filed: Mar. 17, 1975

[21] Appl. No.: 558,775

[52] U.S. Cl. ............................. 210/42 R; 423/127; 423/144; 423/629; 423/632

[51] Int. Cl.² ....................................... B01D 21/00

[58] Field of Search .......... 423/632, 144, 127, 629, 423/339, 184, 198; 210/45, 42 R, 51, 59

[56] References Cited
UNITED STATES PATENTS

| | | | |
|---|---|---|---|
| 1,964,161 | 6/1934 | Kuhnert | 423/184 |
| 1,992,532 | 2/1935 | Kuhnert | 423/192 |
| 2,148,520 | 2/1939 | Windecker | 423/632 |
| 2,194,524 | 3/1937 | Lindsay et al. | 423/629 |
| 2,768,063 | 10/1956 | Domicone | 423/339 |
| 2,781,244 | 2/1957 | Hecklinger | 423/357 |

*Primary Examiner*—Oscar R. Vertiz
*Assistant Examiner*—Wayne A. Langel
*Attorney, Agent, or Firm*—Phillips, Moore, Weissenberger, Lempio & Majestic

[57] ABSTRACT

Ammonium hydroxide is added to a mixture of high-temperature, high-pressure geothermal steam and brine to raise the pH of the brine to between 6.0 and 7.0 and precipitate out a gelatinous sludge of aluminum and iron hydroxides. The hydroxide sludge is suspended in the brine and sweeps out enough dissolved silica so that the temperature and pressure of the brine can be reduced with little, if any, formation of silica scale. Various metals and ammonium hydroxide may then be recovered from the brine, the ammonium hydroxide being recycled in the process.

3 Claims, 2 Drawing Figures

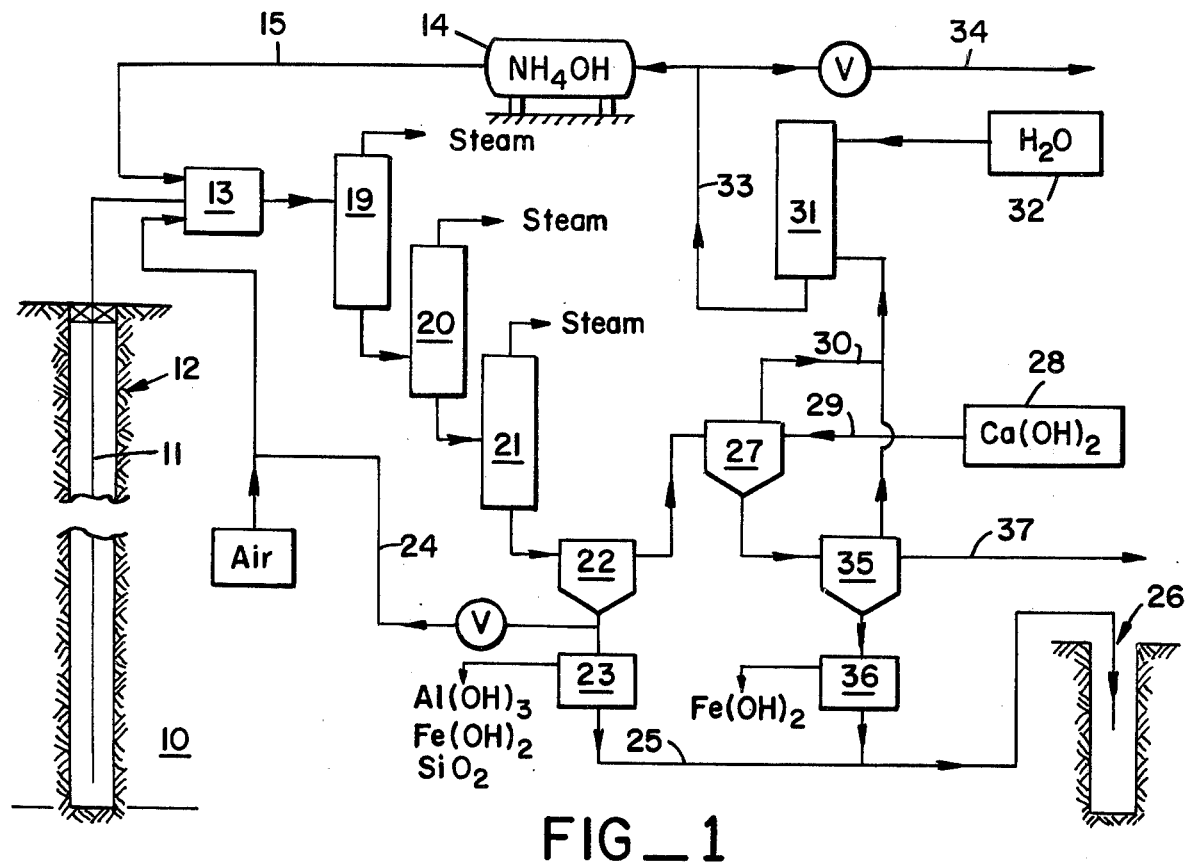
FIG_1
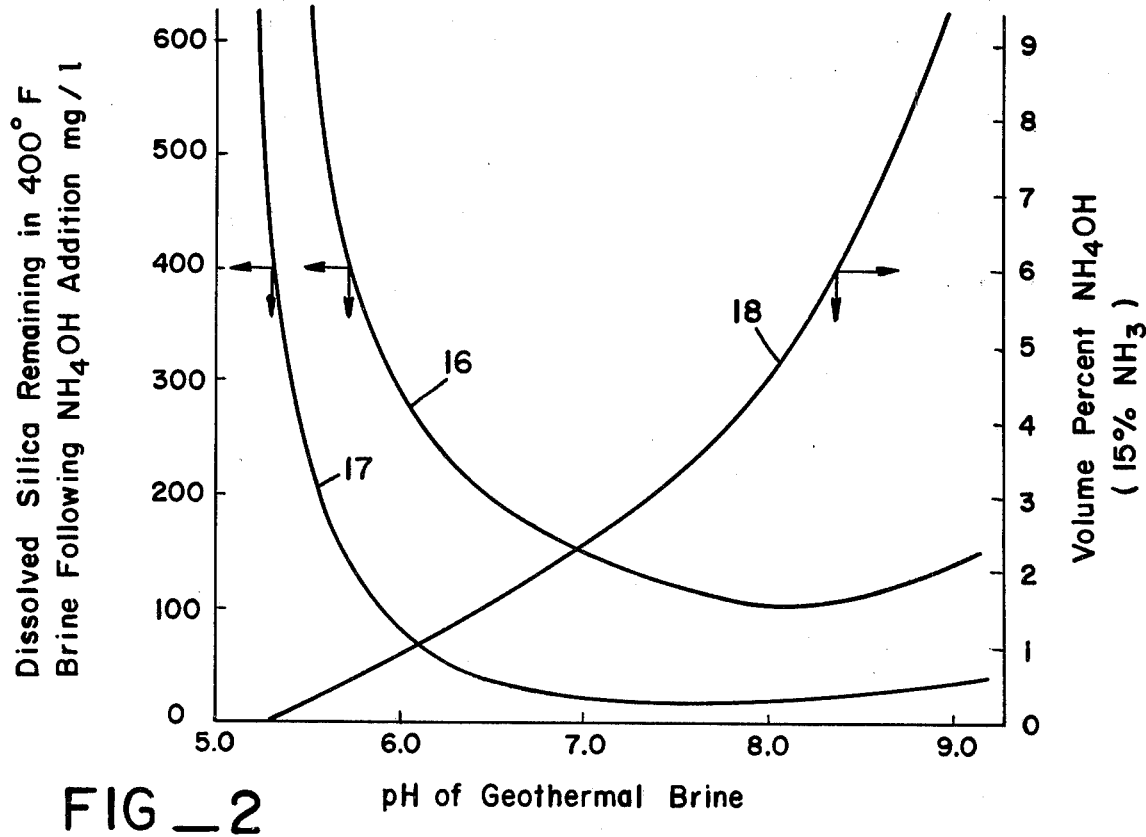
FIG_2

PROCESS FOR REMOVAL OF SILICA FROM GEOTHERMAL BRINE

BACKGROUND OF THE INVENTION

Efforts to recover the resources of the extensive Buttes Geothermal Field in Imperial County, Calif., have been made since the initial discovery of this field in 1958. The underground reservoir generally contains brine at temperatures above 500° F. and at a pressure sufficient to maintain the brine in liquid phase. The geothermal brine is in chemical equilibrium with the surrounding reservoir rock and is unique in that it contains approximately 25 percent by weight dissolved solids, primarily chlorides, including various elements which are economically desirable to recover. Little well-to-well variation in chemical composition has been found — typical samples of the geothermal brine have been analyzed and found to contain, on the average, the following solids dissolved therein:

|  | Concentration in mg/l |
| --- | --- |
| Sodium | 69,700 |
| Potassium | 16,400 |
| Lithium | 200 |
| Calcium | 30,600 |
| Iron | 1,400 |
| Manganese | 1,600 |
| Lead | 100 |
| Magnesium | 80 |
| Silver | nil |
| Zinc | 360 |
| Copper | 3 |
| Barium | 1,300 |
| Strontium | 580 |
| Aluminum | 95 |
| Ammonium ($NH_4$) | 400 |
| Fluoride | 450 |
| Chloride | 148,400 |
| Boron | 180 |
| Sulfate ($SO_4$) | 130 |
| Silica ($SiO_2$) | 860 |
| Total dissolved solids | ~272,900 |

To produce the geothermal reservoir, a well is drilled into the reservoir, typically about 5000 feet in depth. The reservoir is normally in a state of thermal inversion and once this inversion is disturbed, resulting in alleviation of the formation pressure, steam forms in the well casing and entrains brine as it flows up the well. Typically, the produced fluid at the wellhead will be in the order of 90 percent steam by volume (20 percent by weight), the remainder being liquid brine at temperatures of 400°–450° F. and pressures of 200–450 psia.

Efforts to produce this brine commercially have been unsuccessful due to the formidable problems of scaling in the surface equipment, such scaling being chiefly due to the high concentration of dissolved silica in the brine. Analysis of samples of the geothermal brine from the Buttes Field indicates an average of about 860 mg/l silica in solution with a range between 600 to 1300 mg/l. The temperature dependence of the solubility of amorphous silica in water has been determined as:

| Temperature °F. | Solubility of $SiO_2$ (amorphous) mg/l |
| --- | --- |
| 500 | 1,300 |
| 400 | 950 |
| 300 | 600 |
| 200 | 330 |

| Temperature °F. | Solubility of $SiO_2$ (amorphous) mg/l |
| --- | --- |
| 100 | 140 |

Thus, the average dissolved silica concentration in the produced brine is near, and sometimes above, the saturation level of the produced brine at wellhead temperatures. In order to handle the brine and process it for mineral and/or energy recovery, the temperature and pressure must be reduced. As a consequence the silica, having become supersaturated, comes out of solution. The resulting scale is of amorphous structure, containing certain amounts of the other dissolved solids, and is tightly adherent to the walls of surface piping and brine processing equipment. Desired rates of flow for commercial operation cannot be maintained with this scale build-up on system surfaces.

In addition, geothermal brine has a relatively low pH, ranging from about 4.8 to 5.3 but usually about 5.0, at wellhead conditions. Due to the existence of chloride ions and multiple valence ions in their reduced state, corrosion of the system surfaces has been a severe problem in areas where scaling does not occur. Thus, depending on location, the brine-handling system may either be subjected to undesired silica scale formation or subjected to severe corrosion.

It is the principal object of the invention to treat the produced brine whereby silica scale formation is either prevented or reduced to a degree where it may be removed periodically by conventional means, and to render the brine less corrosive, so that the brine may be handled with conventional piping and equipment. In this invention this object is achieved in a manner that renders the brine suitable for subsequent production of steam and/or desirable elements dissolved in the brine.

SUMMARY OF THE INVENTION

Ammonium hydroxide is added to the steam and brine as it is produced at a high temperature and pressure from a geothermal well. The ammonium hydroxide will react with the dissolved aluminum and ferrous ions to form a gelatinous sludge precipitate of aluminum and ferrous hydroxides. This precipitated sludge formed in the brine will "sweep" the brine so that dissolved silica will adsorb on the surface of the sludge particles. It has been found that the degree of silica fixation, or removal, is dependent upon the pH of the brine. Enough ammonium hydroxide is added to the brine to increase the pH of the brine sufficiently so that the remaining dissolved silica will be below its saturation level in the brine at the temperature and pressure to which the brine is reduced for subsequent handling. The precipitated sludge is then removed from the brine so that the clarified brine can then be further processed.

Preferably the amount of ammonium hydroxide added to the brine is maintained at a level such that the pH of the brine is not raised above 7.0, since it has been found that the amount of additional silica removed at a higher pH level is small compared to the required increase of ammonium hydroxide. Additionally, maintaining the pH of the brine at 7.0 or below will minimize the removal from solution of the manganous ions as manganous hydroxide, so that the manganese can be later recovered from the brine.

Besides reducing the dissolved silica concentration to a non-scaling level, the increase in pH of the brine towards a neutral pH due to the ammonium hydroxide addition will also serve to minimize the corrosion of system surfaces exposed to the brine.

Addition of the ammonium hydroxide to the produced brine results in an increased ammonium ion concentration in the brine. Subsequent addition of a strong base, such as calcium hydroxide, to the brine will free ammonia and enable ammonium hydroxide to be recovered for reuse in the process. Although about 5 tons of calcium hydroxide are required to free 4 tons of ammonia from the brine, adding calcium hydroxide to the system for ammonia recovery is an important advantage since calcium hydroxide is less expensive than ammonium hydroxide.

BRIEF DESCRIPTION OF THE DRAWINGS

In the drawings, forming a part of this application,

FIG. 1 is a flow chart, illustrating a system utilizing the present invention for the reduction of silica in geothermal brine;

FIG. 2 is a graph illustrating the relationship between brine pH and dissolved silica concentration when utilizing the present invention, and the relationship between the amount of ammonium hydroxide added and the resultant pH of the brine.

DESCRIPTION OF THE INVENTION

Referring now to FIG. 1, a mixture of geothermal steam and brine is produced from an underground geothermal reservoir 10 up through production string 11 in well 12 and passes through a reaction chamber 13. As mentioned previously, the temperature of the steam and brine at this point will be in the range of 400°–450° F. Ammonium hydroxide from storage tank 14 flows through line 15 and is injected into reaction chamber 13 where it mixes and reacts with the brine. The reaction can be stated as follows:

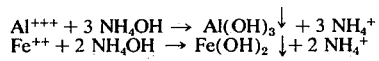

This reaction of ammonium hydroxide with the aluminum ions occurs when a pH of about 5.3 or greater is reached. The reaction of ammonium hydroxide with ferrous ions occurs when a pH of about 5.5 or greater is reached. The ammonium hydroxide will react preferentially to first eliminate the aluminum ions from solution. Usually there is substantially more iron than aluminum dissolved in the brine and thus the precipitation of aluminum hydroxide is obscured by the greater volume of ferrous hydroxide precipitate. However, it has been found at times that the aluminum ion concentration in the brine increases substantially under certain wellhead conditions (a concentration of 580 mg/l has been observed), so that the relative proportion of aluminum hydroxide in the precipitated sludge has been correspondingly increased.

The aluminum and ferrous hydroxides will both precipitate out of the brine as a gelatinous sludge which sweeps the brine, causing a major portion of the high concentration of dissolved silica to adsorb onto the surface of the sludge particles and be fixed thereto. Such silica removal is substantially independent of the particular relative proportions of the aluminum and ferrous hydroxide components of the precipitated sludge.

FIG. 2 is a graph showing the relationship between brine pH and the amount of silica remaining in brine at 400° F. when ammonium hydroxide is added to the brine. The upper and lower curves 16 and 17 represent boundary lines for points established empirically during static tests of this relationship. It has been found through experience that the lower curve 17 more nearly represents the relationship during dynamic operation wherein brine and ammonium hydroxide continuously pass into and through reaction chamber 13 during normal production from the well.

As will be noted, the concentration of dissolved silica in the brine decreases very rapidly at first as the pH is increased to a level wherein the sludge-forming reactions begin, and then decreases at a lower rate with a further increase in pH. It has been found that the lower practical limit for pH is about 6.0. At this pH level the silica concentration has been reduced sufficiently such that although supersaturation and silica scale formation may occur when the temperature of the brine is later reduced, the amount of scale formed will be within tolerable limits whereby such scale can be removed by conventional treatments, such as acidifying with hydrofluoric acid, dissolution with an extremely high pH caustic or mechanical scraping. At a pH below 6.0 the brine can still cause considerable corrosion problems. Additionally, as can be seen from FIG. 2, at low pH levels, the slope of curves 16 and 17 is quite steep, making it difficult to control the process, since slight changes in pH result in large variations in the concentration of silica remaining dissolved in the brine.

The upper desirable limit of operation is at a pH of about 7.0. At such point the brine is neutral and its corrosivity minimized. Very little increase in silica removal will occur if the pH is increased above 7.0. FIG. 2 also shows, by curve 18, the amount of ammonium hydroxide needed to raise the brine pH. Curve 18 has been determined for a situation wherein ferrous hydroxide was the major component of the resultant precipitated sludge, i.e., wherein the concentration of ferrous and aluminum ions was 1400 and 95 mg/l, respectively. An increase in aluminum ion concentration will require a greater addition of ammonium hydroxide. As may be seen from FIG. 2, if ammonium hydroxide is added beyond that required to raise the pH of the brine to 7.0, such additional ammonium hydroxide will represent an extra cost that achieves no particular benefit in the reduction of silica. Further, if the pH is raised above 7.0, the ammonium hydroxide will react with the manganous ions, causing them to be precipitated with the aluminum and ferrous hydroxide and decreasing their subsequent individual recovery.

Preferably the ammonium hydroxide should be added to the brine at a rate such that the brine pH will be about 6.6. This will enable relatively easy control of the process during dynamic operation so that the pH will be maintained within the desired limits in spite of normal variations in flow rates and brine composition. It is to be noted that there is no intent in the present invention to remove all of the dissolved silica from the brine. It is instead the intent to remove enough of the silica so that the remaining dissolved silica will be reduced to a level so that it remains in solution at later process temperatures or scales out in such a small amount that it can be handled easily by conventional descaling treatments.

Although at times the dissolved silica concentration in the produced brine may be supersaturated before it reaches the reaction chamber 13, silica scale deposition is not instantaneous, and the supersaturated silica will precipitate out on the hydroxide sludge in the reaction chamber, along with the dissolved silica which is swept out of the brine by the sludge.

The use of ammonium hydroxide is also advantageous in the present invention since it will produce the least amount of precipitate during the silica removal step. This is of importance because the sludge must be removed from the brine before further processing thereof, and the less the amount of sludge, the less the time, cost and size of equipment necessary for this purpose. If a stronger base, such as sodium hydroxide, were to be used, at the pH levels here involved, calcium hydroxide would be precipitated out with the aluminum and ferrous hydroxide and would have to be removed therewith. Since there is a relatively large amount of calcium in the brine, it is desirable to keep it in solution to allow for its later individual recovery.

After the ammonium hydroxide injection and sludge formation and silica removal step in the reaction chamber 13, the steam, brine and suspended sludge passes, for example, to a series of connected steam separators 19, 20 and 21, where the temperature and pressure of the brine is sequentially reduced and the steam is separated therefrom for beneficial use of for exhaust to atmosphere. For example, in separator 19, the pressure may be reduced to 100 psig, which flashes part of the brine to steam, causing cooling of the brine to about 360° F., the steam exiting from the top of the separator and the brine and sludge exiting together from separator 19 and passing to steam separator 20. Here the pressure may be reduced to 25 psig, cooling the brine to 300° F. The steam is separated from the brine, the latter passing with the entrained sludge to steam separator 21 where the pressure is reduced to atmosphere, cooling the brine to about 230° F. The brine and sludge then flows to settling tank 22. The increase in pH of the brine from the addition of ammonium hydroxide is also beneficial in that the steam flashed from the brine during the pressure reduction steps is less corrosive.

The precipitated aluminum hydroxide, ferrous hydroxide and silica sludge is allowed to settle out in tank 22. From time to time the accumulated sludge is withdrawn from the bottom of the tank and passed to filter 23. If desired, a portion of the brine and sludge may be recycled back to the reaction chamber 13 through line 24, the sludge being lanced with air to oxidize the ferrous hydroxide to ferric hydroxide. The injection of ferric hydroxide into reaction chamber 13 will modify the precipitate formed in the reaction chamber, forming a mixture of ferrous and ferric hydroxides in the sludge that will make the sludge less gelatinous and therefore less likely to stick on equipment surfaces. The filtrate from filter 23 flows through line 25 to be disposed of, as in brine disposal well 26. If the sludge from filter 23 is sufficiently high in aluminum content it may be removed and processed to recover the aluminum. Otherwise, the sludge is simply used as land fill or otherwise discarded.

The clarified brine from tank 22 then passes to reaction tank 27. If the brine still has ferrous ions dissolved therein, calcium hydroxide from supply 28 is delivered through line 29 to tank 27 to react with the brine and scavenge the remaining ferrous ions therefrom by the formation of ferrous hydroxide. The calcium hydroxide will also react with the ammonium ions initially present in the reservoir and also introduced in reaction chamber 13, to release ammonia which passes through line 30 to the ammonia scrubber tower 31. Here water is added from source 32 forming ammonium hydroxide which passes through line 33 to the supply tank 14. If desired, water from the condensation of steam from the steam separators 19, 20 and 21 may be used to replenish the water source 32. Since ammonium ions are initially present in the geothermal reservoir, the system will be a net producer of ammonium hydroxide, and the excess over that used in recycling is taken off through line 34 for sale.

The brine and precipitate passes from reaction tank 27 to settling tank 35. The precipitate is removed from the bottom of tank 35 and passes to filter 36, the filtrate therefrom discharging to the disposal line 25. The clarified brine from tank 35 is then passed through line 37 to suitable equipment for subsequent recovery of desired elements remaining in solution in the brine. If desired, the recovery of ammonia can take place during a subsequent recovery operation wherein a strong base is added to the brine.

Although the reaction chamber 13, wherein ammonium hydroxide is injected into the produced geothermal steam and brine, is shown in FIG. 1 as located above ground, the reaction location can be disposed in production string 11 at a subsurface level so that the brine pH can be neutralized at such level to prevent corrosion of the string 11 thereabove. In such case, the ammonium hydroxide supply line 14 would be extended downhole to the subsurface location in string 11 above which the reaction occurs.

Having thus described my invention, I claim:

1. In a method of recovering energy and minerals from a mixture of geothermal steam and brine produced at a high temperature and pressure from an underground formation, wherein said produced brine is to be reduced to a substantially lower temperature and pressure, said produced brine at said high temperature and pressure having a high total dissolved solids content including dissolved aluminum and ferrous ions and a high concentration of dissolved silica greater than the saturation level of silica in said brine when said brine is at said substantially lower temperature and pressure, said produced brine at said high temperature and pressure having a pH of about 5, the steps of:

a. adding ammonium hydroxide to said produced mixture of steam and brine at said high temperature and pressure and reacting said ammonium hydroxide with said dissolved aluminum and ferrous ions to form soluble ammonium ions and a precipitated sludge of aluminum and ferrous hydroxides in said brine, said ammonium hydroxide being added in an amount sufficient to raise the pH of the brine to a level wherein a substantial portion of the dissolved silica will be swept out with said sludge such that the concentration of the remaining dissolved silica will be near the saturation level of silica in said brine when said brine is at said substantially lower temperature and pressure, b. separating and removing said steam from said brine, c. separating and removing said sludge from said brine, d. reducing the temperature and pressure of said produced brine to said substantially lower temperature and pressure after the formation of said precipitated sludge.

2. A method as set forth in claim 1 and further including:
  e. adding a strong base to said brine after steps (d) and reacting said base with the ammonium ions dissolved therein to release ammonia,
  f. forming ammonium hydroxide from said ammonia produced in step (e) and utilizing the formed ammonium hydroxide in step (a).

3. A method as set forth in claim 1 wherein the pH of the brine is raised in step (a) to a level between 6.0 and 7.0.

* * * * *